United States Patent [19]

Hisaki et al.

[11] 4,098,906
[45] Jul. 4, 1978

[54] NON-FRIED DRY INSTANT COOKING NOODLES AND A METHOD FOR PRODUCING SAID NOODLES

[75] Inventors: Shigeru Hisaki; Ken Okada; Sanpei Murakami, all of Osaka, Japan

[73] Assignee: Kanebo, Ltd., Tokyo, Japan

[21] Appl. No.: 751,659

[22] Filed: Dec. 17, 1976

[30] Foreign Application Priority Data

Apr. 19, 1976 [JP] Japan ................................. 51-44778
Aug. 5, 1976 [JP] Japan ................................. 51-93318

[51] Int. Cl.$^2$ ............................................... A23L 1/16
[52] U.S. Cl. ....................................... 426/94; 426/242; 426/302; 426/557; 426/451; 426/456
[58] Field of Search ................ 426/94, 241, 557, 558, 426/302, 560, 661, 451, 242, 456, 458

[56] References Cited

U.S. PATENT DOCUMENTS

| | | | |
|---|---|---|---|
| 1,349,524 | 8/1920 | Miner | 426/94 |
| 3,318,707 | 5/1967 | Ernst | 426/451 |
| 3,997,676 | 12/1976 | Ando | 426/451 X |

*Primary Examiner*—Robert A. Yoncoskie
*Attorney, Agent, or Firm*—Blanchard, Flynn, Thiel, Boutell & Tanis

[57] ABSTRACT

Non-fried dry instant cooking noodles capable of obtaining the cooked state within 3 minutes when immersed in hot water at 85° C are produced by coating the surfaces of raw noodles consisting mainly of a starch component which mainly is wheat flour and containing 1-6% by weight, based on the absolute dry weight of the noodles, of sodium chloride, with an aqueous emulsion of an edible oil so that 0.2-5% by weight, based on the absolute dry weight of the noodles, of an edible oil and 0.01-5% by weight, based on the absolute dry weight of the noodles, of an emulsifier for said oil are applied on the noodle surfaces, heating such raw noodles with steam having a pressure of 0.5-1.5 kg/cm$^2$ until the α conversion degree of the starch component measured by the enzyme process becomes at least 93%, drying the thus treated noodles at a temperature of not lower than 60° C to expand the noodle surfaces and to make said surfaces porous and to form very fine pores connecting to the inner portions of the noodles.

19 Claims, 2 Drawing Figures

NON-FRIED DRY INSTANT COOKING NOODLES AND A METHOD FOR PRODUCING SAID NOODLES

The present invention relates to non-fried dry instant cooking noodles which have no oily odor and excellent storage stability. The noodles can easily obtain the state of regularly cooked noodles in a very short time when immersed in hot water. The cooked noodles exhibits a slippery feel and a good feel and taste for eating. The invention also relates to a method for producing said noodles.

As instant cooking noodles, there have been known fried instant cooking noodles obtained by boiling raw noodles and then dehydrating the boiled raw noodles with hot oil and, also, non-fried dry instant cooking noodles obtained by boiling raw noodles and then drying them by heating.

However, in the above described fried noodles, the oil is deteriorated when such noodles are stored for more than 6 months after production thereof, whereby their feel and taste for eating are readily degraded, an oily odor is generated and the flavor of a seasoning agent, such as soup and the like, cannot be fully developed. Furthermore, a large amount of oil is contained therein, so that said noodles are not suitable for cooking and eating of general vermicelli and buckwheat vermicelli which need a relatively light taste.

For obviating these defects, the production of the above described non-fried noodles has been proposed but it has been difficult to eliminate the defects of mutual stickiness between noodles due to partial excessive swelling of raw noodles and unevenness of the $\alpha$ conversion degree, which are liable to be caused upon boiling, thereby lowering the cooking ability with hot water and deteriorate the feel and taste thereof for eating, and such noodles have not yet been commercially produced.

A process has been known for producing non-fried instant cooking noodles wherein an oil-in-water emulsion of an edible oil is mixed in wheat flour to form raw noodles and the formed raw noodles are boiled and then the boiled noodles are dried by heating. But the stickiness between the noodles resulting from excessive swelling upon boiling and the unevenness of the $\alpha$ conversion degree deteriorates the ability to cook same with hot water, and also deteriorates the feel and taste thereof during eating and lowers the value of the product. This process has not been commercially carried out. A desirable feature to be provided in instant cooking noodles is that the noodles uniformly obtain the state of regularly cooked noodles when cooked within a temperature range suitable for eating and as low as possible, in a short time, but the commercially available non-fried dry noodles need to be heated in boiling water for about 5 minutes and the fried noodles must be left to stand for more than 3 minutes in hot water of higher than 90° C.

If instant cooking noodles capable of obtaining the state of regularly cooked noodles when immersed in hot water at a temperature of lower than 85° F, in a short time, can be produced, hot water at a temperature which is reduced by storage for a long time, for example, in a vacuum bottle, can be used and hot water having a low boiling point boiled at high elevations under low atmospheric pressure can be satisfactorily used and the production of such noodles has been broadly demanded.

The inventors have diligently studied in order to obviate the above described defects of the prior art and found that when non-fried dry instant cooking noodles obtained by coating the surface of raw noodles containing sodium chloride with an aqueous emulsion of an edible oil and then subjecting the thus treated noodles to a heat treatment ($\alpha$ conversion treatment) with steam and the like, the $\alpha$ conversion is uniformly high, a specific porous structure having irregular very fine network cells connecting the inner layer and the outer surface is formed, so that hot water used for cooking is smoothly and easily absorbed in the noodles and said noodles are transformed uniformly to the state of regularly cooked noodles, and a good feel for eating is obtained. Further, in this case the emulsifier present on the outer surface is dissolved to reduce the surface tension of the hot water and contributes to the rapid penetration, uniform absorption and cooking. The sodium chloride present in the inner layer and the edible oil on the surfaces of the noodles give a slippery feel and a moderate elasticity (resiliency) during eating and a good feel and taste for eating are obtained. Further, the sodium chloride coexisting with $\alpha$-starch restrains and prevents $\beta$ conversion of the starch and storage stability for a long period of time can be attained. Thus, the present invention has been accomplished.

An object of the present invention is to provide non-fried dry instant cooking noodles which have no oily odor, can be stably stored for a long period of time without deteriorating the feel and the taste for eating. The noodles uniformly and easily obtain the state of regularly cooked noodles within a very short time (within 3 minutes) when immersed in hot water at 85° C. The cooked noodles show moderate slippery and elastic feel and good feel and taste for eating.

A further object of the present invention is to provide a method for producing commercially easily and cheaply the non-fried dry instant cooking noodles.

The other objects will become apparent from the following description.

The present invention consists in non-fried dry instant cooking noodles characterized in that said noodles consist mainly of a starch component comprising mainly wheat flour and they contain 1–6% by weight of sodium chloride, the $\alpha$ conversion degree of the starch component measured by the enzyme process is at least 93%, the noodles have a porous structure connecting the inner layer and the outer surface by irregular very fine network cells and the noodles are coated with 0.2–5% by weight of an edible oil and 0.01–5% by weight of an emulsifier for said oil on the outer surface and are recovered transformed into the boiled noodle state within 3 minutes when immersed in hot water at 85° C.

Furthermore, the present invention consists in a method for producing non-fried dry instant cooking noodles having a property capable of being transformed to the boiled noodle state within 3 minutes when immersed in hot water at 85° C, characterized in that, to raw noodles consisting mainly of starch component comprised mainly of wheat flour and containing 1–6% by weight of sodium chloride, there is applied an emulsion of the edible oil of an oil-in-water type so that the surface of the raw noodles are coated with 0.2–5% by weight of an edible oil and 0.01–5% by weight of an emulsifier for said oil and then the thus treated raw noodles are heated with steam having a pressure of 0.5–1.5 kg/cm$^2$ until the α conversion degree of the above described starch component measured by the enzyme process becomes at least 93%, after which the steamed noodles are dried at a temperature of not lower than 60° C to expand the surfaces of the noodles and to make the surfaces porous and to form very fine cells connecting to the inner portions of the noodles.

The invention will be explained in more detail hereinafter.

The term "α conversion degree of the starch component measured by the enzyme process" used herein means the α conversion degree of the dry instant cooking noodles determined by the enzyme (diastase) process explained hereinafter.

The dry instant cooking noodles according to the present invention are mainly comprised of a starch component having an α conversion degree of at least 93% and the starch component consists mainly of wheat flour.

The raw noodles to be used in the present invention are comprised of wheat flour or a mixture consisting mainly of wheat flour and containing a second flour or starch; 25–40% by weight of water; if necessary a well known improving agent for noodles, such as sodium polyphosphate, "Kansui" (an aqueous solution containing potassium carbonate, sodium carbonate, potassium phosphate and sodium phosphate); an edible additive and a seasoning agent. "Kansui" is an agent for increasing the viscosity of noodles and is an extract of banana and Taiwan plantain.

The term "starch component" used herein means wheat flour, second flour and starch and the term "consisting mainly of wheat flour" used herein means wheat flour alone or a mixture consisting mainly of wheat flour and containing at least one of a second flour and starch.

The content of wheat flour in the starch component is preferred to be 70–100% by weight based on the absolute dry weight of the starch component.

The second flour includes, for example, buckwheat vermicelli, rice flour and the like and the starch includes, for example, corn starch, potato starch, waxy corn starch, wheat flour starch and the like.

The water content in the raw noodles is 25–40% by weight and when the water content is less than 25% by weight, the starting mixture maintains a powdery state and it is difficult to form noodles, while when the water content is more than 40% by weight, after the steaming treatment for converting the starch into the α-form, the noodles stick to one another.

The raw noodles usually used in the present invention are formed by the following processes, wheat flour, second flour, starch, an improving agent for noodles, a seasoning agent and water are mixed and kneaded and the formed blend is rolled and molded by means of a cutter or the above described blend is molded by means of an extruder, but the forming process is not limited to these processes. The fineness of the noodles is not limited and any noodles of thick form and thin form may be used.

Sodium chloride is uniformly dispersed and contained in the raw noodles used in the present invention and the amount thereof is 1–6% by weight, preferably 2–4% by weight, based on the absolute dry weight of the noodles. When the content of sodium chloride is less than 1% by weight, the cooking speed is slow and if a large amount of water has been contained during storage for a long period of time, the α converted starch component returns to the β-form (lowering of the α conversion degree), whereas when said sodium chloride content is more than 6% by weight, the cooked noodles are insufficient in elasticity and resiliency and become brittle and the feel during eating is liable to be deteriorated. Thus, such contents should be avoided.

As mentioned above, when 1–6% by weight of sodium chloride is contained in the noodles, even if a relatively large amount of water is absorbed during the storage for a long period of time, the β conversion of the α converted starch is prevented and such a content contributes to the stability and improves the cooking ability and the eating feel, so that the addition of sodium chloride exhibits a remarkable functional effect and is one characteristic of the present invention.

Furthermore, the noodles containing an improving agent for noodles, such as sodium polyphosphate, an aqueous solution of a mixture of potassium carbonate, sodium carbonate, potassium phosphate and sodium phosphate and the like; and a viscous binder, such as gum, carboxymethylcellulose and the like improve the feel and the taste for eating.

To the raw noodles there is applied an aqueous emulsion of an edible oil and the noodles are then heated with steam. As the aqueous emulsion, use is usually made of an emulsion composed of an edible oil, water and an edible emulsifier.

As the edible oils to be used in the present invention, mention may be made of rice bran oil, corn oil, rape oil, sesame oil, soybean oil, salad oil and the like.

As the emulsifiers, mention may be made of nonionic emulsifiers, such as sucrose higher fatty acid esters (monostearate, monopalmitate, dipalmitate, monooleate, distearate and the like), sorbitan higher fatty acid esters (for example, tristearate, trioleate and the like), propylene glycol fatty acid esters (monostearate, tristearate and the like); glycerin fatty acid esters (for example, glycerin monostearate, glycerin capric acid ester, ester of glycerin and a mixed acid of capric acid and caprilic acid) and an anionic emulsifier, such as lecithin.

For coating the surfaces of the noodles with the emulsion, it is preferable to spray or sprinkle the emulsion having a proper composition so that 2.7–18% by weight, based on the weight of the raw noodles, preferably 5.4–10.8% by weight, of water, 0.2–5% by weight, preferably 0.3–4% by weight, of the edible oil and 0.01–5% by weight, preferably 0.02–3% by weight, of the emulsifier are coated on the surfaces of the raw noodles. In this case, when the amount of water is less than 2.7% by weight, it is difficult to promote the α conversion and the cooking speed is slow and the feel for eating is deteriorated, whereas when said amount is more than 18% by weight, the noodles excessively swell upon steaming and therefore the noodles readily stick to one another and the feel for eating is deteriorated. Accordingly, these amounts are not preferable.

When the amount of the edible oil coated is less than 0.2% by weight, it is difficult to restrain an excessive swelling of the noodles and mutual stickiness between the noodles is liable to be caused and the feel for eating tends to be deteriorated, whereas when said amount is more than 5% by weight, the feel for eating and the storage stability for a long period of time tend to be deteriorated.

Although the composition of the edible oil in the emulsion is not limited, the emulsion of the oil-in-water type obtained by emulsifying a mixture of 1–65% by weight of the edible oil and 35–99% by weight of water with the edible emulsifier (0.01–5% by weight, based on the said mixture) is preferable.

As a means for coating the surfaces of noodles with the aqueous emulsion of the edible oil, it is preferable to spray the emulsion with a spray gun or sprinkle the emulsion with a shower system. But said means is not limited to these processes.

After the raw noodles are coated on the surface with the aqueous emulsion of the edible oil, the noodles are heated with steam (steaming). For steaming, the usual well known conditions employed when the raw noodles are heated with steam, can be applied but it is preferable to contact the raw noodles with steam having a pressure of 0.5–1.5 kg/cm$^2$ for about 2–5 minutes. The steamed noodles are generally subjected to a drying step to dry the noodles to a water content of less than about 15% by weight. As the drying process, usual hot air heating, infrared heating, microwave heating and the like may be applied. The drying temperature is preferred to be 60°–130° C, more preferably 90°–110° C.

The drying time is 5–80 minutes, preferably 10–30 minutes, more particularly 12–20 minutes.

During such drying step, the water in the $\alpha$-starch matrix, which matrix moderately swelled in the above described steaming step, evaporates rapidly and in this stage, the whole matrix expands and an irregular very fine network of continuous cells is formed and a specific porous structure is obtained.

The $\alpha$ conversion degree of the starch component constituting the non-fried dry instant cooking noodles according to the present invention is at least 93%, preferably at least 94%, more particularly at least 96%. If the $\alpha$ conversion degree is less than 93%, when the hot water is added, the cooking is difficult and such noodles give a wheat flour-like raw feeling and the feel for eating is not good.

Furthermore, the non-fried dry instant cooking noodles according to the present invention is with a small amount of 0.2–5% by weight of the edible oil, while the amount of the edible oil in general fried instant cooking noodles is a large amount of about 15–20% by weight. Moreover, the edible oil in the non-fried noodles of the present invention is a fresh edible oil which has not been heated at a high temperature (150° C) such as occurs in the fried instant cooking noodles, so that even if the noodles are stored for about one year, deterioration and change of quality of the oil do not occur and even if such an oil coats the noodles, said oil does not deteriorate the feel for eating and taste of the instant cooking noodles and further the noodles show a moderate slippery feeling and taste.

Since the edible oil substantially coats only the surfaces of the noodles, said oil does not prevent the penetration of hot water such as occurs in fried noodles wherein the surface and the inner texture are covered with an oil film. Furthermore, the coexisting fine particles of the emulsifier are immediately dissolved by contacting with hot water to reduce the surface tension of the hot water and increase the penetration of the hot water so that the hot water rapidly penetrates into the spaces between the edible oil particles and into the inner portions of the noodles from the continuous very fine cells on the surface of the noodles coated with the emulsifier particles and the noodles can be transformed to the state of regularly cooked noodles in a short time. This is one characteristic of the present invention.

The amount of the edible emulsifier is 0.01–5% by weight, preferably 0.02–3% by weight, based on the absolute dry weight of the noodles. The dry instant cooking noodles are shaped into a fine linear form, the cross-section of which is rectangular and the length of the shorter side, that is the thickness, is preferably 1.3 mm at the largest, more preferably 0.7–0.9 mm. When the thickness is larger than 1.3 mm, the cooking speed becomes slow, so that such a thickness is not preferable.

The width, that is the length of the longer side of the cross-section of the noodle is generally 1–2.2 mm. The cross-sectional form is not limited to rectangular and it may be circular, oval, hollow and it can be optionally selected, but it is not preferable from the same reasons as described above that its thickness be excessively large.

The dry instant cooking noodles have a porous structure wherein the inner layers and the outer surfaces are connected by the irregular very fine network cells, so that upon cooking, the hot water rapidly penetrates and is absorbed and the noodles are transformed to the state of regularly cooked noodles in a short time. In this case, the irregular very fine network cells connecting the inner layers and the outer surfaces of the noodles serve the capillary function owing to the very fine spaces of the cell's cross-section and this capillary function, the osmotic pressure due to dissolution of sodium chloride present in the inner portion of the noodles and the function for reducing the surface tension of the added hot water due to the above described emulsifier coated on the surface of the noodles act synergistically and the penetration of the hot water and the cooking of the noodles are considerably promoted and further a moderate elasticity (resiliency) is given to the cooked noodles for eating and the good feel for eating is obtained.

The dry instant cooking noodles according to the present invention are substantially dry but the water content is generally not more than 15% by weight, preferably not more than 10% by weight, more particularly 6–8% by weight. When the water content exceeds 15% by weight, mold grows during storage for a long period of time and the protein in the wheat flour may be readily decomposed, so that such an amount of water is not preferable.

The dry instant cooking noodles according to the present invention have no oily odor and are stable without deteriorating the feel for eating and the taste even when stored for a long period of time and the cooking is attained uniformly and completely in a short time, so that the noodles can be easily cooked and further the slippery feeling, the good feel for eating and taste can be obtained and consequently the noodles are very high in commercial value as instant cooking wheat vermicelli, instant cooking vermicelli, instant cooking buckwheat vermicelli and so on.

As mentioned above, the nonn-fried instant cooking noodles according to the present invention have a variety of characteristics and merits but a particularly noticeable characteristic as compared with the conventional instant cooking noodles is that the noodles can be completely cooked into the boiled noodle form within 3 minutes by immersion in hot water at 85° C.

Hitherto, fried noodles capable of being transformed to the state of regularly cooked noodles within 3 minutes by immersion in hot water at a temperature of higher than 90° C have been well known but in this technical field, a temperature at 85° C is considered to be a fairly low temperature and instant cooking noodles which can completely be transformed to the stage of regularly cooked noodles within a time as short as 3 minutes at such a low temperature have never been developed.

The non-fried dry instant cooking noodles according to the present invention can be transformed to the state of regularly cooked noodles within 3 minutes at 85° C and in a preferred embodiment, can fully achieve said state within 3 minutes at 83° C and is some cases, may completely achieve said state within 3 minutes at 80° C, whereby the noodles have a very excellent cooking ability. Accordingly, hot water which is stored in a vacuum bottle for a long time and wherein the temperature is reduced, can be employed or hot water having a low boiling point which is boiled at high elevations where the atmospheric pressure is low, can be satisfactorily used and further the fear that the mouth eater's will be burnt upon eating is avoided and the convenience for eating is great.

The following examples are given for the purpose of illustration of this invention and are not intended as limitations thereof.

In the following examples, "part" and "%" mean by weight, "α conversion degree" means the α conversion degree of the above described starch component measured by the enzyme (diastase) process and is determined as follows.

(1) Process for measuring α conversion degree by the enzyme (diastase) process.

The samples are prepared as follows.

Fried instant cooking noodles are degreased with ethyl ether at 50° C and then more than 20 g of such noodles are pulverized. For the non-fried noodles, more than 20 g of such noodles are directly pulverized. The powders having a fine grain size of less than 100 mesh are used. In the measurement, 5 conical flasks of 100 ml are used with respect to one sample and these flasks are referred to as $A_1$-$A_4$ and B. 1.00 g of the above described adjusted sample is respectively weighed and placed in the $A_1$-$A_4$ flasks. The tolerance of the weighed amounts in the four flasks is made to be within ±5%. 50 ml of water is added to each of the five flasks and among them, $A_2$ and $A_4$ are heated and boiled for 15 minutes and then quenched to room temperature in ice water.

On the other hand, to $A_1$, $A_3$ and B is added 5 ml of 5% aqueous diastase solution respectively and all the 5 flasks are kept at 37° C±1° C for 90 minutes while shaking in a thermostat containing water, after which 2 ml of 1NH$_4$Cl is added to all the flasks to stop the diastase reaction and the content in each flask is transferred into a 100 ml flask and water is added thereto 100 ml. Each solution is filtered by means of a dry filter paper and from the filtrates obtained from the flasks $A_1$-$A_4$ and B, 10 ml of filtrate is fed in a conical flask with a ground stopper by a pipette and said filtrates are referred to as $a_1$-$a_4$ and b.

In this stage, a conical flask with ground stopper containing 10 ml of water taken up by a pipette is prepared for a blank test. 10 ml of N/10 aqueous solution of iodine is added to each of the 6 flasks.

Then 18 ml of N/10 aqueous solution of sodium hydroxide is added to each of the 6 flasks in turn in the same time interval by means of a stop watch and the flask is corked and shaken and then left to stand for 15 minutes. When the first flask has stood for 15 minutes, 2 ml of 10% sulfuric acid is added to the flask in the same order and the same interval as when N/10 aqueous solution of sodium hydroxide was first added, rapidly as soon as the stopper is opened and these solutions are titrated with N/10 aqueous solution of sodium thiosulfate and the titrated values of $a_1$-$a_4$ and b are referred to as $P_1$-$P_4$ and Q and the titrated value of the blank test is referred to as r. α conversion degree (%) is determined by the following formula.

$$\alpha \text{ conversion degree} = \frac{(r-P_3)-(r-P_4)-(r-Q)}{(r-P_1)-(r-P_2)-(r-Q)} \times 100$$

(2) Sensory Estimation Upon Eating

Rating points of taste and cooking ability are based on sensory estimation upon test eating. 400 cc of hot water at 85° C is poured on 70 g of the instant cooking noodles samples and is left to stand for 3 minutes. A test panel of 13 persons judges the samples. The rating points are as follows:

| 10 : Very good, | 8 : Good, |
|---|---|
| 6 : Normal, | 4 : Bad, |
| 2 : Very bad. | |

These points are shown by the average values (decimals of more than 0.5 inclusive are raised to the next higher number and the rest are ignored).

The feel for eating test results (stick to teeth ... wheat flour-like raw feeling) show the number of persons among the 13 person panel who indicate these feelings after eating the samples cooked by immersion in 400 cc of hot water at 85° C for 3 minutes.

Points 8–10 for estimating the cooking ability correspond to the estimation of the cooking ability when the commercially available noodles, which are eaten after boiling, are boiled.

(3) Porous Structure The outer surfaces and the cross-section of the test noodles are observed by an electron microscope and it is determined whether the porous structure wherein the inner layer and the outer surface are connected with the very fine network cells having irregular flat cross-sectional form, is provided or not.

EXAMPLE 1

To 500 parts of wheat flour was added a mixed solution of 170 parts of water, 10 parts of sodium chloride and 1 part of a solution of the Kansui composition, namely, a mixture of potassium carbonate, sodium carbonate, potassium phosphate and sodium phosphate, and the resulting mixture was rolled to a thickness of 0.85 mm by rollers and shaped into raw noodles by means of No. 20 cutter. The raw noodles (681 parts) were uniformly sprayed with an emulsion consisting of 940 parts of water, 60 parts of salad oil and 2 parts of sucrose higher fatty acid ester (sucrose oleic acid ester) by means of a spray gun and 12% of the emulsion was coated on the surfaces of the raw noodles (0.72% based on the weight of the raw noodles of salad oil, 0.02% of the emulsifier and 11.26% of water were coated). Thereafter, the thus treated raw noodles were heated with steam of 1.0 kg/cm$^2$ for 3 minutes (the water content after steaming: 38%) and then dried by hot air at a temperature of 100° C with an air speed of 15 m/sec until the water content of the noodles became 8% to obtain the instant cooking noodles of the present invention (sample 1) having the irregular very fine network porous structure connecting the inner layer to the outer surface.

As comparative sample 1, the emulsion was sprayed and then the noodles were treated in the same manner as described above except that only the steaming was not carried out.

As a comparative sample 2, the emulsion was sprayed in the same manner as described above and then dried by hot air at 100° C for 2 minutes at an air speed of 3 m/sec, after which the same steaming as in the present invention was carried out to dry the noodles to a water content of 38% and then the same drying as in the present invention was carried out.

As a comparative sample 3, the raw noodles were treated in the same manner as in the present invention except that the noodles were coated with 11.28% of water instead of the emulsion.

As a comparative sample 4, the raw noodles were treated in the same manner as in the present invention except that the emulsion was not applied.

As a comparative sample 5, the raw noodles were treated in the same manner as in the present invention except that 0.72% of salad oil alone was coated.

The instant cooking noodles of the above described present invention sample 1 and the comparative samples 1–5 were immersed in hot water at 85° C for 3 minutes and the taste estimation of these samples were determined and the cooking ability of these samples after being immersed in hot water as 83° C, 85° C and 90° C for 3 minutes, respectively, was determined and the obtained results are shown in the following Table 1.

In the following Tables, the term "person" means the number of persons of the test panel who reported the property in question.

Table 1

|  | Comparative Sample | | | | | Present invention Sample 1 |
| --- | --- | --- | --- | --- | --- | --- |
|  | 1 | 2 | 3 | 4 | 5 | |
| Sensory estimation upon eating | | | | | | |
| Stick on teeth (person) | 0 | 0 | 7 | 8 | 0 | 0 |
| Slippery feeling is insufficient (person) | 0 | 0 | 10 | 10 | 0 | 0 |
| Slippery feeling is excessive (person) | 0 | 0 | 0 | 0 | 0 | 0 |
| Elasticity is insufficient (person) | 11 | 11 | 6 | 5 | 0 | 0 |
| Elasticity is excessive (person) | 1 | 1 | 0 | 0 | 8 | 0 |
| Too hard (person) | 13 | 13 | 0 | 13 | 13 | 0 |
| Wheat flour-like raw feeling (person) | 13 | 13 | 4 | 13 | 13 | 0 |
| Taste estimation (point) | 2 | 2 | 5 | 4 | 2 | 10 |
| Cooking ability at 85° C for 3 minutes (point) | 2 | 2 | 4 | 4 | 2 | 10 |
| Cooking ability at 83° C for 3 minutes (point) | 2 | 2 | 5 | 4 | 2 | 10 |
| Cooking ability at 90° C for 3 minutes (point) | 2 | 2 | 6 | 5 | 2 | 10 |
| Properties of products | | | | | | |
| Content of NaCl (%) | 2.24 | 2.24 | 2.24 | 2.24 | 2.24 | 2.24 |
| α conversion degree (%) | 30.4 | 33.6 | 92.3 | 90.7 | 89.8 | 96 |
| Amount of edible oil coated (%) | 0.72 | 0.72 | 0 | 0 | 0.72 | 0.72 |
| Amount of emulsifier coated (%) | 0.02 | 0.02 | 0 | 0 | 0 | 0.02 |
| Very fine network cells having irregular flat cross-sectional shape | None | None | None | None | None | Present |

As seen from the above results, the instant cooking noodles having the slippery feeling (good feeling estimation) and the good cooking ability can be obtained by satisfying the requirements constituting the present invention.

As a comparative sample 6, a mixture of 500 parts of wheat flour, 1 part of a mixture of potassium carbonate, sodium carbonate, potassium phosphate and sodium phosphate, 10 parts of sodium chloride and 83 parts of the emulsion in Example 1 was kneaded and the raw noodles were shaped in the same manner as in the present invention sample 1 in Example 1 and then heated by steam and dried without being coated with the emulsion to obtain instant cooking noodles.

The qualities of the thus formed instant cooking noodles, commercially available fried instant cooking noodles, commercially available non-fried dry noodles and the non-fried noodles of the present invention sample 1 in Example 1 are shown in the following Table 2.

Table 2

| Test Item | Comparative Sample 6 | | Commercially available fried instant cooking noodles | Commercially available dry noodles | Present invention Sample 1 | |
| --- | --- | --- | --- | --- | --- | --- |
|  | Immediately after production | After 6 months | After 3 months | After 3 months | Immediately after production | After 6 months |
| Sensory estimation upon eating | | | | | | |
| Stick on teeth (person) | 5 | 8 | 0 | 3 | 0 | 0 |
| Slippery feeling is insufficient (person) | 10 | 2 | 6 | 7 | 0 | 0 |
| Slippery feeling is excessive (person) | 0 | 0 | 0 | 0 | 0 | 0 |
| Elasticity is excessive (person) | 0 | 0 | 8 | 6 | 0 | 0 |
| Too hard (person) | 12 | 13 | 12 | 13 | 0 | 0 |
| Wheat flour-like raw feeling (person) | 13 | 12 | 12 | 13 | 0 | 0 |
| Oily odor (person) | 0 | 1 | 13 | 0 | 0 | 0 |
| Taste eastimation (point) | 4 | 4 | 4 | 4 | 10 | 8 |
| Cooking ability at 85° C | | | | | | |

Table 2-continued

|  | Comparative Sample 6 | | Commercially available fried instant cooking noodles | Commercially available dry noodles | Present invention Sample 1 | |
| --- | --- | --- | --- | --- | --- | --- |
| Test Item | Immediately after production | After 6 months | After 3 months | After 3 months | Immediately after production | After 6 months |
| for 3 minutes (point) Cooking ability at 83° C | 4 | 4 | 4 | 4 | 10 | 10 |
| for 3 minutes (point) Cooking ability at 90° C | 4 | 4 | 4 | 4 | 10 | 10 |
| for 3 minutes (point) | 4 | 4 | 4 | 4 | 10 | 10 |
| Properties of products | | | | | | |
| Content of NaCl (%) | 2.24 | 2.24 | 0.86 | 0.67 | 2.24 | 2.24 |
| α conversion degree (%) | 91.0 | 90.1 | 95.0 | 90.5 | 96.2 | 95.0 |
| Amount of edible oil coated (%) | 0.72 (containing) | 0.72 (containing) | 16.5 | 0 | 0.72 (coating) | 0.72 (coating) |
| Amount of emulsifier coated (%) | 0.02 (containing) | 0.02 (containing) | 0 | 0 | 0.02 (coating) | 0.02 (coating) |
| Very fine network cells having irregular flat cross-sectional shape | None | None | None | None | Present | Present |

Note:
[1] In the amounts of the edible oil and the emulsion in the above Table 2, the term "containing" attached under the numeral value means the content in the noodles and the term "coating" means the amount coated on the surface of the noodles.
[2] When the commercially available non-fried dry noodles were immersed in hot water at 95° C for 10 minutes, the cooking ability was 6 point and these noodles were not satisfactorily cooked and when the dry noodles were immersed in boiling water for 10 minutes, the noodles was able to be satisfactorily cooked.
[3] In the test after 3 months and 6 months, the samples stored in a chamber at 25° C and 70% RH were used.

Note:
(1) In the amounts of the edible oil and the emulsion in the above Table 2, the term "containing" attached under the numeral value means the content in the noodles and the term "coating" means the amount coated on the surface of the noodles.

(2) When the commercially available non-fried dry noodles were immersed in hot water at 95° C for 10 minutes, the cooking ability was 6 point and these noodles were not satisfactorily cooked and when the dry noodles were immersed in boiling water for 10 minutes, the noodles was able to be satisfactorily cooked.

(3) In the test after 3 months and 6 months, the samples stored in a chamber at 25° C and 70% RH were used.

As seen from the above results, the instant cooking noodles according to the present invention wherein the emulsion is coated on the surface of the noodles, can provide a more excellent slippery feeling, taste and cooking estimation than the noodles wherein the emulsion is contained in the noodles.

Furthermore, the commercially available non-fried dry noodles cannot be cooked even with hot water at 95° C and when the commercially available fried instant cooking noodles are immersed in hot water at 83° C for 3 minutes, these noodles are not cooked and further even if such fried noodles are immersed in hot water at 85° C for 3 minutes, these noodles are not satisfactorily cooked. Furthermore, it has been found that 3 months after production, the fried noodles have an oily odor and do not show excellent taste and flavor. The pores in the dry noodles of the present invention are noticeably different from those of the fried noodles in the size and form.

EXAMPLE 2

Figure 1:
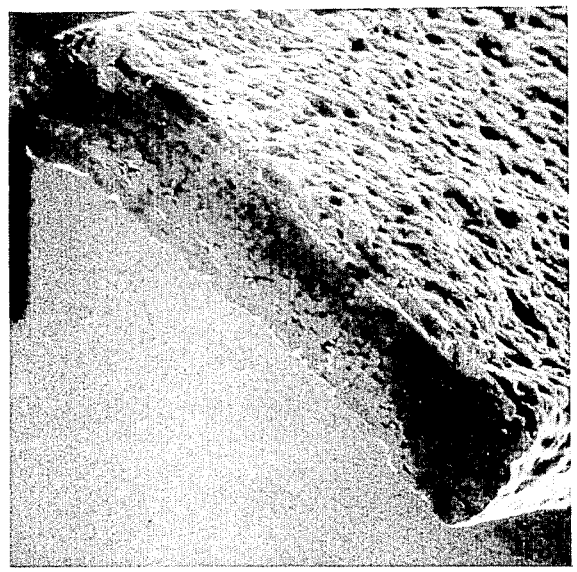
FIG. 1 is an electron microscopic photograph (magnification: 50 times) showing the surface and the crossection of the non-fried dry instant cooking noodles of the present invention obtained in Example 1.
Figure 2:
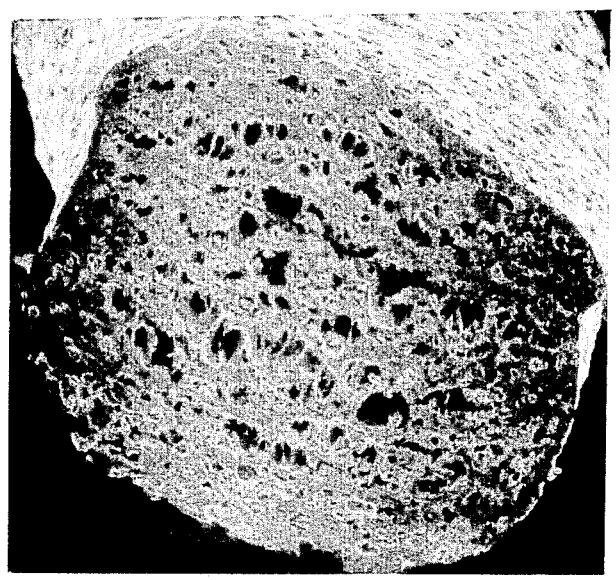
FIG. 2 is an electron microscopic photograph (magnification: 50 times) showing the surface and the crossection of the commercially available fried instant cooking noodles.

To wheat flour alone, a mixture of wheat flour with buckwheat vermicelli or a mixture of wheat flour with a starch and a gum was added a solution of 170 parts of water, and sodium chloride and/or a mixture of potassium carbonate, sodium carbonate, potassium phosphate and sodium phosphate and the mixture was thoroughly stirred and mixed in a mixer and the resulting blend was treated in the same manner as in the present invention sample 1 in Example 1.

The weight percentage of the components in each sample is shown in the following Table 3 as the absolute dry weight.

Table 3

|  | Present invention sample | | | |
| --- | --- | --- | --- | --- |
|  | 1 | 2 | 3 | 4 |
| Wheat flour (%) | 96.41 | 66.14 | 70.75 | 86.39 |
| Buckwheat flour (%) | — | 28.35 | — | — |
| Starch (%) | — | — | 21.56 | 9.26 |
| $K_2CO_3$, $Na_2CO_3$, $K_3PO_4$ and $Na_3PO_4$ (Kansui) (%) | 0.22 | — | 0.32 | — |
| Gum (%) | — | — | 1.95 | 1.00 |
| Amount of NaCl contained (%) | 2.24 | 4.40 | 4.33 | 2.23 |
| Amount of salad oil coated (%) | 1.10 | 1.08 | 1.06 | 1.09 |
| Amount of sucrose ester coated (%) | 0.03 | 0.03 | 0.03 | 0.03 |

The results of the sensory estimation upon eating after the samples 1-4 of the present invention in the above Table 3 were immersed in hot water at 85° C for 4 minutes are shown in the following Table 4.

Table 4

|  | Present invention sample | | | |
| --- | --- | --- | --- | --- |
| Test Item | 1 | 2 | 3 | 4 |
| Sensory estimation upon eating | | | | |
| Stick on teeth (person) | 0 | 0 | 0 | 0 |
| Slippery feeling is insufficient (person) | 0 | 0 | 0 | 0 |
| Slippery feeling is excessive (person) | 0 | 0 | 0 | 0 |
| Elasticity is insufficient (person) | 0 | 0 | 0 | 0 |
| Elasticity is excessive (person) | 0 | 0 | 0 | 0 |
| Too hard (person) | 0 | 0 | 0 | 0 |
| Wheat flour-like raw feeling (person) | 0 | 0 | 0 | 0 |
| Taste estimation (point) | 10 | 10 | 10 | 10 |
| Cooking ability at | | | | |

Table 4-continued

| Test Item | Present invention sample | | | |
|---|---|---|---|---|
| | 1 | 2 | 3 | 4 |
| 85° C for 3 minutes (point) | 10 | 10 | 10 | 10 |
| Cooking ability at 83° C for 3 minutes (point) | 10 | 10 | 10 | 10 |
| Cooking ability at 90° C for 3 minutes (point) | 10 | 10 | 10 | 10 |
| Properties of products | | | | |
| α conversion degree (%) | 96.2 | 94.3 | 97.6 | 96.4 |
| Very fine network cells having irregular flat cross-sectional shape | Present | Present | Present | Present |

As seen from the results in the above table, the instant cooking noodle samples 2–4 consisting mainly of wheat flour and containing second flour, starch, gum, sodium chloride and the like can provide excellent instant cooking noodles having the same qualities as in the present invention sample 1 in Example 1.

EXAMPLE 3

In this example, the instant cooking noodles having various thicknesses were produced in the same manner as in the present invention sample 1 in Example 1 except that the thickness of the noodles was varied. The obtained results are shown in the following Table 5.

Table 5

| Test Item | Thickness of noodle | | | |
|---|---|---|---|---|
| | 0.5 mm | 0.8 mm | 1.3 mm | 2.0 mm |
| Sensory estimation upon eating | | | | |
| Stick on teeth (person) | 0 | 0 | 0 | 0 |
| Slippery feeling is insufficient (person) | 0 | 0 | 0 | 0 |
| Slippery feeling is excessive (person) | 0 | 0 | 0 | 0 |
| Elasticity is insufficient (person) | 5 | 0 | 0 | 0 |
| Elasticity is excessive (person) | 0 | 0 | 1 | 3 |
| Too hard (person) | 0 | 0 | 3 | 7 |
| Too soft (person) | 6 | 0 | 0 | 0 |
| Wheat flour-like raw feeling (person) | 0 | 0 | 3 | 9 |
| Taste estimation (point) | 7 | 10 | 7 | 4 |
| Cooking ability at 85° C for 3 minutes (point) | 10 | 10 | 8 | 5 |
| Cooking ability at 83° C for 3 minutes (point) | 10 | 10 | 8 | 4 |
| Cooking ability at 90° C for 3 minutes (point) | 10 | 10 | 9 | 6 |
| Properties of products | | | | |
| α conversion degree (%) | 97.1 | 96.3 | 93.1 | 88.6 |
| Very fine network pores having irregular flat cross-sectional shape | Present | Present | Present | Present |

As seen from the results in the above table, the noodles having the thickness of 1.3 mm at the largest show excellent qualities.

EXAMPLE 4

The instant cooking noodles containing various amounts of sodium chloride in the noodles were produced in the same manner as in the present invention sample 1 in Example 1 except that said amount was 0, 1, 3, 6, 10% (based on the absolute dry weight of the noodle).

The obtained results are shown in the following Table 6.

Table 6

| Test Item | Content of sodium chloride in noodles | | | | |
|---|---|---|---|---|---|
| | 0% | 1% | 3% | 6% | 10% |
| Sensory estimation upon eating | | | | | |
| Stick on teeth (person) | 0 | 0 | 0 | 0 | 0 |
| Slippery feeling is insufficient (person) | 0 | 0 | 0 | 0 | 0 |
| Slippery feeling is excessive (person) | 0 | 0 | 0 | 0 | 0 |
| Elasticity is insufficient (person) | 0 | 0 | 0 | 3 | 9 |
| Elasticity is excessive (person) | 2 | 0 | 0 | 0 | 0 |
| Too hard (person) | 4 | 1 | 0 | 0 | 0 |
| Wheat flour-like raw feeling (person) | 0 | 0 | 0 | 0 | 0 |
| Taste estimation (point) | 6 | 9 | 10 | 8 | 6 |
| Cooking ability at 85° C for 3 minutes (point) | 6 | 9 | 10 | 10 | 10 |
| Cooking ability at 83° C for 3 minutes (point) | 6 | 6 | 10 | 10 | 10 |
| Cooking ability at 90° C for 3 minutes (point) | 8 | 10 | 10 | 10 | 10 |
| Properties of products | | | | | |
| α conversion degree (%) | 96.1 | 96.2 | 96.5 | 96.7 | 97.0 |
| Very fine network pores having irregular flat cross-sectional shape | Present | Present | Present | Present | Present |

As seen from the results of the above table, the amount of sodium chloride contained in the noodles must be 1–6%.

EXAMPLE 5

The instant cooking noodles having various amounts of salad oil coated on the surfaces of the noodles were produced in the same manner as in the present invention sample 1 in Example 1 except that said amount of salad oil was varied to 0%, 0.2%, 1.1%, 3%, 5% and 10% by weight (based on the absolute dry weight of the noodles) by adjusting the composition and the sprayed amount of the aqueous emulsion of said oil. The obtained results are shown in the following Table 7.

Table 7

| Test Item | Amount of edible oil coated | | | | | |
|---|---|---|---|---|---|---|
| | 0% | 0.2% | 1.1% | 3% | 5% | 10% |
| Sensory estimation upon eating | | | | | | |
| Stick on teeth (person) | 7 | 3 | 0 | 0 | 0 | 0 |
| slippery feeling is insufficient (person) | 10 | 2 | 0 | 0 | 0 | 0 |
| slippery feeling is excessive (person) | 0 | 0 | 0 | 0 | 3 | 9 |
| Elasticity is insufficient (person) | 6 | 1 | 0 | 0 | 0 | 0 |
| Elasticity is excessive (person) | 0 | 0 | 0 | 0 | 3 | 10 |
| Too hard (person) | 0 | 0 | 0 | 0 | 4 | 7 |
| Wheat flour-like raw feeling (person) | 4 | 0 | 0 | 0 | 0 | 1 |
| Taste estimation (point) | 5 | 7 | 10 | 10 | 7 | 5 |
| Cooking ability at 85° C for 3 minutes (point) | 6 | 8 | 10 | 10 | 7 | 6 |
| Cooking ability at 83° C for 3 minutes (point) | 6 | 7 | 10 | 10 | 7 | 6 |
| Cooking ability at 90° C for 3 minutes | | | | | | |

Table 7-continued

| Test Item | Amount of edible oil coated | | | | | |
|---|---|---|---|---|---|---|
| | 0% | 0.2% | 1.1% | 3% | 5% | 10% |
| (point) Properties of products | 6 | 9 | 10 | 10 | 7 | 6 |
| Content of NaCl (%) | 2.25 | 2.25 | 2.24 | 2.23 | 2.22 | 2.02 |
| α conversion degree (%) | 96.8 | 96.7 | 96.2 | 96.0 | 95.4 | 93.8 |
| Amount of emulsifier coated ;10 (%) | 0.03 | 0.03 | 0.03 | 0.03 | 0.03 | 0.03 |
| Very fine network pores having irregular flat cross-sectional shape | None | Present | Present | Present | Present | None |

As seen from the results of the above table, the amount of the edible oil coated on the surface of the noodles must be 0.2–5%.

EXAMPLE 6

The instant cooking noodles having various amounts of an emulsifier (sucrose higher fatty acid ester) coated on the surface of the noodles were produced in the same manner as in the present invention sample 1 in Example 1 except that said amount of emulsifier was varied to 0%, 0.01%, 0.02%, 1%, 3%, 5% and 7% by weight (based on the absolute dry weight of the noodles) by adjusting the composition and the sprayed amount of the aqueous emulsion. The obtained results are shown in the following Table 8.

Table 8

| Test Item | Amount of emulsifier coated | | | | | | |
|---|---|---|---|---|---|---|---|
| | 0% | 0.01% | 0.02% | 1% | 3% | 5% | 8% |
| Sensory estimation upon eating Stick on teeth (person) | 4 | 2 | 0 | 0 | 0 | 0 | 0 |
| Slippery feeling is insufficient (person) | 3 | 0 | 0 | 0 | 0 | 0 | 0 |
| Slippery feeling is excessive (person) | 0 | 0 | 0 | 0 | 1 | 3 | 9 |
| Elasticity is insufficient (person) | 0 | 0 | 0 | 0 | 1 | 2 | 8 |
| Elasticity is excessive (person) | 0 | 0 | 0 | 0 | 0 | 0 | 0 |
| Too hard (person) | 2 | 0 | 0 | 0 | 0 | 0 | 0 |
| wheat flour-like raw feeling (person) | 0 | 0 | 0 | 0 | 0 | 0 | 0 |
| Taste estimation (point) | 6 | 8 | 10 | 10 | 8 | 7 | 5 |
| Cooking ability at 85° C for 3 minutes (point) | 9 | 9 | 10 | 10 | 10 | 10 | 10 |
| Cooking ability at 83° C for 3 minutes (point) | 9 | 9 | 10 | 10 | 10 | 10 | 10 |
| Cooking ability at 90° C for 3 minutes (point) | 10 | 10 | 10 | 10 | 10 | 10 | 10 |
| Properties of products Content of NaCl (%) | 2.25 | 2.25 | 2.24 | 2.23 | 2.22 | 2.20 | 2.18 |
| α conversion degree (%) | 92.8 | 95.7 | 96.2 | 96.4 | 96.5 | 96.8 | 97.2 |
| Amount of salad oil coated (%) | 1.11 | 1.11 | 1.10 | 1.08 | 1.07 | 1.05 | 1.01 |

As seen from the results of the above table, the amount of the emulsifier coated on the surface of the noodles must be 0.01–5% by weight, preferably 0.02–3% by weight.

EXAMPLE 7

To 500 parts of wheat flour was added a mixed solution of 170 parts of water, 10 parts of sodium chloride and 1 part of a mixture of potassium carbonate, sodium carbonate, potassium phosphate and sodium phosphate and the resulting mixture was rolled to a thickness of 0.8 mm by rollers and shaped into raw noodles by means of No. 24 cutter. The raw noodles (681 parts) were uniformly sprayed with an emulsion consisting of 900 parts of water, 100 parts of salad oil and 2 parts of sucrose higher fatty acid ester (sucrose palmitic acid ester) by means of a spray gun and 12% of the emulsion was coated on the surface of the raw noodles (1.2% based on the weight of the raw noodles of salad oil, 0.02% of sucrose palmitic acid ester of the emulsifier and 10.8% of water were coated). Thereafter, the thus treated raw noodles were heated with steam of 1.0 kg/cm$^2$ for 2 minutes (water content after steaming: 38%) and then dried by hot air at a temperature of 100° C in an air speed of 20 m/sec until the water content of the noodles became 7% to obtain the porous instant cooking noodles of the present invention sample having the very fine pores.

As a comparative sample 7, the emulsion was sprayed and then the noodles were dried in the same manner as described above without effecting the steaming.

As a comparative sample 8, the emulsion was sprayed in the same manner as described above and then dried by hot air at 100° C for 2 minutes at an air speed of 3 m/sec, the same steaming as in the present invention was carried out to dry the noodles to a water content of 38% and the same drying as in the present invention was carried out.

As a comparative sample 9, the raw noodles were treated in the same manner as in the present invention except that the noodles were coated with 10.8% of water instead of the emulsion.

As a comparative sample 10, the raw noodles were treated in the same manner as in the present invention except that the emulsion was not applied.

As a comparative sample 11, the raw noodles were treated in the same manner as in the present invention except that 1.2% of salad oil alone was coated.

The instant cooking noodles of the above described present invention sample and the comparative samples 7-11 were determined with respect to the degree of stickiness between the noodles and the feel for eating and taste estimation. The obtained results are shown in the following Table 9.

Table 9

| Test Item | Comparative Sample | | | | | Present invention |
|---|---|---|---|---|---|---|
| | 7 | 8 | 9 | 10 | 11 | |
| Sensory estimation upon eating Stickiness between noodles | Very much | Very much | Very much | Much | None | None |
| Stick on teeth (person) | 0 | 0 | 6 | 7 | 0 | 0 |
| Slippery feeling is insufficient (person) | 12 | 12 | 5 | 5 | 0 | 0 |
| Slippery feeling is excessive (person) | 0 | 0 | 0 | 0 | 10 | 0 |
| Elasticity is insufficient (person) | 0 | 0 | 11 | 10 | 0 | 0 |
| Elasticity is excessive (person) | 0 | 0 | 0 | 0 | 0 | 0 |
| Too hard (person) | 13 | 13 | 0 | 13 | 13 | 0 |
| Wheat flour-like raw feeling (person) | 13 | 13 | 3 | 12 | 13 | 0 |
| Taste estimation (point) | 2 | 2 | 6 | 4 | 2 | 10 |

As seen from the results of the above table, the process wherein the raw noodles are applied with the emulsion consisting of an edible oil, water and an emulsifier, heated with steam and then dried, which satisfies the requirements constituting the present invention, can provide the instant cooking noodles which do not cause stickiness between the noodles (separating step can be omitted) and give a slippery feeling and the good taste estimation.

EXAMPLE 8

The instant cooking noodles were produced in the same manner as in the present invention sample in Example 7 except that the pressure of steam and the steaming time were varied as shown in the following Table 10. The obtained results are shown in Table 10.

Table 10

| Pressure of steam(kg/cm$^2$) | 0.2 | 0.5 | 0.5 | 1.0 | 1.0 | 1.5 | 1.5 | 2.0 | 2.0 |
|---|---|---|---|---|---|---|---|---|---|
| Steaming Time (min) | 2 | 2 | 5 | 2 | 5 | 2 | 5 | 2 | 5 |
| Sensory estimation upon eating Stickiness between noodles | 0 | 0 | 0 | 0 | 0 | 0 | 0 | 0 | 0 |
| Stick on teeth (person) | 5 | 0 | 0 | 0 | 0 | 0 | 0 | 0 | 0 |
| Slippery feeling is insufficient (person) | 0 | 0 | 0 | 0 | 0 | 0 | 0 | 0 | 0 |
| Slippery feeling is excessive (person) | 0 | 0 | 0 | 0 | 0 | 0 | 0 | 0 | 0 |
| Elasticity is insufficient (person) | 5 | 0 | 0 | 0 | 0 | 0 | 0 | 0 | 0 |
| Elasticity is excessive (person) | 0 | 0 | 1 | 0 | 3 | 1 | 3 | 5 | 6 |
| Too hard (person) | 0 | 0 | 0 | 0 | 0 | 0 | 0 | 0 | 0 |
| Wheat flour-like raw feeling (person) | 4 | 0 | 0 | 0 | 0 | 0 | 0 | 0 | 0 |
| Taste estimation (point) | 6 | 10 | 8 | 10 | 7 | 9 | 7 | 6 | 5 |

As seen from the results of the above table, the pressure of steam and the steaming time must be 0.5-1.5 kg/cm$^2$ and 2-5 minutes respectively.

EXAMPLE 9

The instant cooking noodles were produced in the same manner as in the present sample in Example 7 except that the drying temperature and the drying time were varied as shown in the following Table 11. The obtained results are shown in Table 11.

Table 11

| Drying temperature (° C) | 20 | 60 | 70 | 80 | 90 | 100 | 110 | 120 | 130 | 150 |
|---|---|---|---|---|---|---|---|---|---|---|
| Drying time (min) | 80 | 60 | 45 | 30 | 23 | 15 | 12 | 10 | 8 | 4 |
| Sensory estimation upon eating Stikiness between noodles | none | none | none | none | none | none | none | none | none | cause |
| Stick on teeth (person) | 2 | 0 | 0 | 0 | 0 | 0 | 0 | 0 | 0 | |
| Slippery feeling is insufficient (person) | 0 | 1 | 1 | 0 | 1 | 0 | 0 | 0 | 1 | 5 |
| Slippery feeling is excessive (person) | 2 | 0 | 0 | 0 | 0 | 0 | 0 | 0 | 0 | 0 |
| Elasticity is insufficient (person) | 4 | 2 | 0 | 0 | 1 | 0 | 0 | 0 | 3 | 7 |
| Elasticity is excessive (person) | 0 | 0 | 1 | 0 | 0 | 0 | 0 | 2 | 0 | 0 |
| Too hard (person) | 0 | 0 | 0 | 0 | 0 | 0 | 0 | 0 | 1 | 10 |
| Wheat flour-like raw feeling (person) | 0 | 0 | 0 | 0 | 0 | 0 | 0 | 0 | 0 | 0 |
| Taste estimation (point) | 6 | 7 | 7 | 8 | 9 | 10 | 10 | 8 | 7 | 4 |

As seen from the results in the above table, the drying temperature is preferred to be 60°-130° C, more particularly 90°-110° C.

EXAMPLE 10

The instant cooking noodles were produced in the same manner as in the present sample in Example 7 except that the raw noodles having the water content as shown in the following Table 12 were used and the qualities of the obtained noodles were determined. The obtained results are shown in the following Table 12.

Table 12

| Water content of raw noodles (%) | 20 | 25 | 30 | 35 | 40 | 45 |
|---|---|---|---|---|---|---|
| Sensory estimation upon eating Stickiness between noodles | none | none | none | none | none | cause |
| Stick on teeth (person) | 0 | 0 | 0 | 0 | 0 | 1 |
| Slippery feeling is insufficient (person) | 4 | 0 | 0 | 0 | 0 | 0 |
| Slippery feeling is excessive (person) | 0 | 0 | 0 | 0 | 0 | 0 |
| Elasticity is insufficient (person) | 0 | 0 | 0 | 0 | 2 | 5 |
| Elasticity is excessive (person) | 1 | 0 | 0 | 0 | 0 | 0 |
| Too hard (person) | 5 | 1 | 0 | 0 | 0 | 4 |
| Wheat flour-like raw feeling (person) | 6 | 2 | 1 | 0 | 0 | 0 |
| Taste estimation (point) | 4 | 7 | 8 | 10 | 8 | 5 |

As seen from the results in the above table, the water content of the raw noodles is preferred to be 25–40%.

EXAMPLE 11

The instant cooking noodles were produced in the same manner as in the present invention sample in Example 7 except that sucrose stearic acid ester, sorbitan stearic acid ester or monoglyceride stearate alone was used instead of sucrose palmitic acid ester and the qualities of the obtained noodles were determined. The obtained results are shown in the following Table 13.

Table 13

| Emulsifier | Sucrose stearic acid ester | Sorbitan stearic acid ester | Monoglyceride stearate |
|---|---|---|---|
| Sensory estimation upon eating | | | |
| Stickiness between noodles | none | none | none |
| Stick on teeth (person) | 0 | 0 | 0 |
| Slippery feeling is insufficient (person) | 0 | 1 | 1 |
| Slippery feeling is excessive (person) | 0 | 0 | 0 |
| Elasticity is insufficient (person) | 0 | 0 | 0 |
| Elasticity is excessive (person) | 0 | 0 | 0 |
| Too hard (person) | 0 | 0 | 0 |
| Wheat flour-like raw feeling (person) | 0 | 0 | 0 |
| Taste estimation (point) | 10 | 10 | 10 |

As seen from the results in the above table, sucrose higher fatty acid ester, sorbitan higher fatty acid ester, monoglyceride of a higher fatty acid and the like can be effectively used.

What is claimed is:

1. Non-fried, dry, instant cooking noodles capable of obtaining the cooked state within 3 minutes were immersed in hot water at a temperature of 85° C, consisting essentially of a starch component and from one to 6% of sodium chloride, said starch component being comprised mainly of wheat flour and having an α conversion degree of at least 93% as measured by a diastase enzyme process, said noodles having a porous structure wherein the interior portions and the external surfaces of said noodles are connected by an irregular network of very fine cells, the surfaces of said noodles being coated with 0.2 to 5% of an edible oil and from 0.01 to 5% of an edible emulsifier, all percentages being based on the absolute dry weight of the noodles.

2. Non-fried, dry, instant cooking noodles as claimed in claim 1, wherein the starch component is wheat flour alone or a mixture of at least 70% by weight of wheat flour and at least one substance selected from the group consisting of a second flour and starch.

3. Non-fried, dry, instant cooking noodles as claimed in claim 1, wherein the noodles contain at least one of an effective amount of an improving agent for noodles and an effective amount of a viscous binding agent.

4. Non-fried, dry, instant cooking noodles as claimed in claim 1, wherein the content of said sodium chloride in the noodles is 2–4%.

5. Non-fried, dry, instant cooking noodles as claimed in claim 1, wherein the amount of said edible oil coated on the surfaces of the noodles is 0.3–4%.

6. Non-fried, dry, instant cooking noodles as claimed in claim 1, wherein said edible oil is selected from the group consisting of rice bran oil, corn oil, rape oil, sesame oil, soybean oil and salad oil.

7. Non-fried, dry, instant cooking noodles as claimed in claim 1, wherein the content of the edible emulsifier is 0.02–3%.

8. Non-fried, dry, instant cooking noodles as claimed in claim 1, wherein the edible emulsifier is selected fron the group consisting of sucrose higher fatty acid esters, sorbitan higher fatty acid esters, glycerin higher fatty acid esters and lecithin.

9. Non-fried, dry, instant cooking noodles as claimed in claim 1, wherein the thickness of the noodles is not greater than 1.3 mm.

10. Non-fried, dry, instant cooking noodles as claimed in claim 1, wherein the water content of the noodles is not more than 15% by weight.

11. A method of preparing non-fried, dry, instant cooking noodles capable of obtaining the cooked state within 3 minutes when immersed in hot water at a temperature of 85° C, which comprises coating (A) the surfaces of raw noodles consisting essentially of a starch component and from one to 6% of sodium chloride, with (B) an aqueous emulsion of an edible oil and containing an edible emulsifier for said oil, so that 0.2 to 5% of said edible oil and from 0.01 to 5% of said emulsifier are applied on the surfaces of the noodles; heating said coated raw noodles with steam at a pressure of 0.5 to 1.5 Kg/cm$^2$ until the starch component of said noodles has an α conversion degree of at least 93% as measured by a diastase enzyme process; then drying said steamed noodles at a temperature of not lower than 60° C to a water content of less than about 15% and thereby expanding the noodle surfaces to make said surfaces porous and to form very fine pores connecting the inner portions of the noodles to said surfaces, all percentages being based on the absolute dry weight of said noodles.

12. A method as claimed in claim 11, wherein the water content of said raw noodles is 25–40%.

13. A method as claimed in claim 11, wherein the aqueous emulsion is applied on the raw noodle surfaces in such an amount that said coated raw noodles are coated with 0.3–4% of said edible oil and 0.02–3.0% of said edible emulsifier.

14. A method as claimed in claim 11, wherein the coating of said aqueous emulsion is effected by spraying or sprinkling.

15. A method as claimed in claim 11, wherein said heating with said steam is effected for 2–5 minutes.

16. A method as claimed in claim 11, wherein said drying is effected at a temperature of 60°–130° C.

17. A method as claimed in claim 11, wherein said drying is effected for 5–80 minutes.

18. A method as claimed in claim 11, wherein said drying is effected by at least one process of hot air heating, infrared heating and microwave heating.

19. A method as claimed in claim 11, wherein said emulsifier is selected from the group consisting of sucrose higher fatty acid esters, sorbitan higher fatty acid esters, glycerin higher fatty acid esters and lecithin.

* * * * *

UNITED STATES PATENT AND TRADEMARK OFFICE
CERTIFICATE OF CORRECTION

PATENT NO. : 4 098 906
DATED : July 4, 1978
INVENTOR(S) : Shigeru Hisaki et al

It is certified that error appears in the above-identified patent and that said Letters Patent are hereby corrected as shown below:

Column 19, line 35; change "were" to ---when---.

Column 20, line 9; change "fron" to ---from---.

Signed and Sealed this

Nineteenth Day of December 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,098,906
DATED : July 4, 1978
INVENTOR(S) : Shigeru Hisaki et al

It is certified that error appears in the above—identified patent and that said Letters Patent are hereby corrected as shown below:

Column 7, line 44; change "$A_2$ and $A_4$" to ---$A_1$ and $A_2$---.

Column 7, line 50; change "$1NH_4Cl$" to ---1N HCl---.

Signed and Sealed this

*Eighteenth* Day of *March 1980*

[SEAL]

Attest:

SIDNEY A. DIAMOND

*Attesting Officer*     *Commissioner of Patents and Trademarks*